US010045391B2

(12) United States Patent
Lei et al.

(10) Patent No.: US 10,045,391 B2
(45) Date of Patent: Aug. 7, 2018

(54) METHODS, APPARATUSES AND COMPUTER PROGRAM PRODUCTS FOR PROSE COMMUNICATION

(71) Applicant: Nokia Technologies Oy, Espoo (FI)

(72) Inventors: Yixue Lei, Beijing (CN); Zhi Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 75 days.

(21) Appl. No.: 14/897,111

(22) PCT Filed: Jun. 28, 2013

(86) PCT No.: PCT/CN2013/078404
§ 371 (c)(1),
(2) Date: Dec. 9, 2015

(87) PCT Pub. No.: WO2014/205793
PCT Pub. Date: Dec. 31, 2014

(65) Prior Publication Data
US 2016/0135243 A1 May 12, 2016

(51) Int. Cl.
*H04W 76/14* (2018.01)
*H04L 12/24* (2006.01)
*H04W 76/23* (2018.01)

(52) U.S. Cl.
CPC ......... *H04W 76/14* (2018.02); *H04L 41/0823* (2013.01); *H04W 76/23* (2018.02)

(58) Field of Classification Search
CPC ................ H04W 76/14; H04L 41/0823
See application file for complete search history.

(56) References Cited

U.S. PATENT DOCUMENTS

2010/0158044 A1* 6/2010 Ray .................... H04L 63/0428
370/469
2010/0173610 A1* 7/2010 Kitazoe ............ H04W 36/0038
455/411

(Continued)

FOREIGN PATENT DOCUMENTS

CN 103002456 A 3/2013
CN 103037450 A 4/2013

(Continued)

OTHER PUBLICATIONS

International Search Report and Written Opinion received for corresponding Patent Cooperation Treaty Application No. PCT/CN2013/078404, dated Mar. 13, 2014, 9 pages.

(Continued)

*Primary Examiner* — Brandon M Renner
*Assistant Examiner* — Jay L Vogel
(74) *Attorney, Agent, or Firm* — Harrington & Smith

(57) ABSTRACT

Methods, corresponding apparatuses, and computer program products for ProSe communication are provided. A method comprises sending, from a first base station, a first configuration message to at least one of two user equipments which are performing ProSe communication over a first locally routed path via the first base station such that the two user equipments perform the ProSe communication over a second locally routed path via a second base station. The method also comprises sending, from the first base station, a second configuration message to the second base station such that the second base station is configured to support the two user equipments to perform the ProSe communication over the second locally routed path via the second base station. In the method, ciphering and deciphering of ProSe communication traffic at a specific protocol layer by the first base station is skipped such that the ciphering and deciphering are performed by the two user equipments or by the (Continued)

second base station and the two user equipments. With the claimed invention, the back-and-forth routing between the first base station and second base station resulting in heavy traffic load can be alleviated.

20 Claims, 6 Drawing Sheets

(56) References Cited

U.S. PATENT DOCUMENTS

| | | | |
|---|---|---|---|
| 2012/0208571 A1* | 8/2012 | Park | H04L 67/1063 455/466 |
| 2013/0102314 A1* | 4/2013 | Koskela | H04W 36/0072 455/436 |
| 2014/0355444 A1* | 12/2014 | Turtinen | H04W 8/005 370/235 |

FOREIGN PATENT DOCUMENTS

| | | | |
|---|---|---|---|
| WO | WO 2011109027 A1 * | 9/2011 | ........ H04W 36/0072 |
| WO | 2012/088470 A1 | 6/2012 | |
| WO | 2012/166975 A1 | 12/2012 | |
| WO | 2013/023353 A1 | 2/2013 | |
| WO | 2013/063792 A1 | 5/2013 | |
| WO | 2014/067573 A1 | 5/2014 | |

OTHER PUBLICATIONS

"Study on LTE Device to Device Proximity Services", 3GPP TSG-RAN meeting #58, RP-122009, Agenda: 13.2, Qualcomm Incorporated, Dec. 6, 2012, 6 pages.

"New Study Item Description: Small Cell Enhancements for E-UTRA and E-UTRAN—Higher-Layer Aspects", 3GPP TSG-RAN meeting #58, RP-122033, Agenda: 13.2, NTT Docomo Inc., Dec. 4-7, 2012, 5 pages.

"Discussion on Different Backhaul Alternatives for Small Cell Enhancements", 3GPP TSG-RAN WG2 Meeting #81bis, R2-131107, Agenda: 7.2, Nokia Corporation, Apr. 15-19, 2013, 4 pages.

"Tarana Wireless Looks to Shake Up Small Cell Backhaul", RCR Wireless News, Retrieved on Dec. 22, 2016, Webpage available at: http://www.rcrwireless.com/20130225/network-infrastructure/tarana-wireless-shakes-small-cell-backhaul#prettyPhoto.

Extended European Search Report received for corresponding European Patent Application No. 13887833.5, dated Dec. 15, 2016, 6 pages.

* cited by examiner

US 10,045,391 B2

METHODS, APPARATUSES AND COMPUTER PROGRAM PRODUCTS FOR PROSE COMMUNICATION

RELATED APPLICATION

This application was originally filed as Patent Cooperation Treaty Application No. PCT/CN2013/078404 filed Jun. 28, 2013.

FIELD OF THE INVENTION

Example embodiments of the present invention generally relate to wireless communication techniques including the 3GPP (the 3rd Generation Partnership Project) LTE (Long Term Evolution) technique. More particularly, example embodiments of the present invention relate to methods, apparatuses, and computer program products for ProSe (Proximity Service) communication.

BACKGROUND OF THE INVENTION

Various abbreviations that appear in the specification and/or in the drawing figures are defined as below:
  BS Base Station
  CA Carrier Aggregation
  CN Core Network
  DRB Data Radio Bearer
  eNB evolved Node B
  EPS Enhanced Packet System
  EPC Enhanced Packet Core
  GW Gateway
  HLR Home Location Register
  HSS Home Subscriber Server
  MeNB Macro eNB
  MME Mobility Management Entity
  MSC Mobile Switching Centre
  NAS Non Access Stratum
  OAM Operations, Administrations and Maintenance
  PDCP Packet Data Convergence Protocol
  PDU Protocol Data Unit
  PCell Primary Cell
  ProSe Promixity Service
  RAN Radio Access Network
  RB Radio Bearer
  RLC Radio Link Control
  RRC Radio Resource Control
  RRM Radio Resource Management
  SCell Secondary Cell
  SeNB Small Cell eNB
  SRB Signaling Radio Bearer
  UE User Equipment
  VLR Visitor Location Register
  WAN Wide Area Network The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

With the rapid developments of an LTE system, a high-speed data service via low power nodes (e.g., a small cell BS) becomes increasingly important to suit the requirements of wireless communication users. It is known that the small cell BS, which is generally deployed to be closer to UEs than a macro BS in some certain areas, such as at hotspots, is capable of providing a relatively high speed data service. Therefore, how to provide ProSe communication either via direct UE-to-UE communication, or locally routed by eNB without CN involved to achieve a high speed data rate under a wireless communication system, e.g., the LTE system, has become a hot topic in the 3GPP.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

According to an aspect of the present invention, there is provided a method. The method comprises sending, from a first BS, a first configuration message to at least one of two UEs which are performing ProSe communication over a first locally routed path via the first BS such that the two UEs perform the ProSe communication over a second locally routed path via a second BS. The method also comprises sending, from the first BS, a second configuration message to the second BS such that the second BS is configured to support the two UEs to perform the ProSe communication over the second locally routed path via the second BS. In the method, ciphering and deciphering of ProSe communication traffic at a specific protocol layer by the first BS is skipped such that the ciphering and deciphering are performed by the two UEs or by the second BS and the two UEs.

In one embodiment, the method further comprises sending, from the first BS, a third configuration message to another one of the two UEs such that the two UEs perform the ProSe communication over a third locally routed path communication merely via the second BS.

In another embodiment, the second configuration message includes configuration parameters regarding user plane paths to be established between the two UEs and the second BS such that the second BS performs the ciphering and deciphering at the specific protocol layer.

In yet another embodiment, the first and third configuration messages as discussed above include configuration parameters regarding locally routed path security keys for the two UEs to cipher and decipher ProSe user traffic at the specific protocol layer.

In a further embodiment, the specific protocol layer as discussed above is a PDCP layer.

According to another aspect of the present invention, there is provided a method. The method comprises receiving, at a second BS, a configuration message from a first BS via which two UEs are performing ProSe communication over a first locally routed path. The method also comprises establishing a connection with at least one of the two UEs based on the configuration message such that the two UEs perform the ProSe communication over a second locally routed path via the second BS. In the method, ciphering and deciphering of ProSe communication traffic at a specific protocol layer is performed by the second BS rather than the first BS.

In one embodiment, the method further comprises establishing a connection with another one of the two UEs based on the configuration message such that the two UEs perform the ProSe communication over a third locally routed path merely via the second BS.

In another embodiment, the configuration message includes context information of the two UEs in the ProSe communication via the second or third locally routed path through the second BS.

In a further embodiment, the specific protocol layer as discussed above is a PDCP layer.

According to an aspect of the present invention, there is provided a method. The method comprises receiving, by one of two UEs, a configuration message from a first BS via which two UEs are performing ProSe communication over a first locally routed path. The method also comprises establishing a connection with a second BS based on the configuration message such that the two UEs perform the ProSe communication over a second locally routed path via the second BS. In the method, ciphering and deciphering of ProSe communication traffic at a specific protocol layer is performed by the two UEs rather than the first and second BSs.

In an embodiment, the configuration message includes configuration parameters regarding locally routed path security keys for the two UEs to cipher and decipher ProSe user traffic at the specific protocol layer.

In another embodiment, the method further comprises performing the ProSe communication with another one of the two UEs over a third locally routed path merely via the second BS.

In a further embodiment, the specific protocol layer as discussed above is a PDCP layer.

According to an aspect of the present invention, there is provided an apparatus. The apparatus comprises at least one processor and at least one memory including computer program code. The memory and the computer program code are configured to, working with the processor, cause the apparatus to perform at least sending, from the apparatus, a first configuration message to at least one of two UEs which are performing ProSe communication over a first locally routed path via the apparatus such that the two UEs perform the ProSe communication over a second locally routed path via a second BS. The memory and the computer program code are further configured to, working with the processor, cause the apparatus to perform at least sending, from the apparatus, a second configuration message to the second BS such that the second BS is configured to support the two UEs to perform the ProSe communication over the second locally routed path via the second BS, wherein ciphering and deciphering of ProSe communication traffic at a specific protocol layer by the apparatus is skipped such that the ciphering and deciphering are performed by the two UEs or by the second BS and the two UEs.

According to another aspect of the present invention, there is provided an apparatus. The apparatus comprises at least one processor and at least one memory including computer program code. The memory and the computer program code are configured to, working with the processor, cause the apparatus to perform at least receiving, at the apparatus, a configuration message from a first BS via which two UEs are performing ProSe communication over a first locally routed path. The memory and the computer program code are further configured to, working with the processor, cause the apparatus to perform at least establishing a connection with at least one of the two UEs based on the configuration message such that the two UEs perform the ProSe communication over a second locally routed path via the apparatus, wherein ciphering and deciphering of ProSe communication traffic at a specific protocol layer is performed by the apparatus rather than by the first BS.

According to a further aspect of the present invention, there is provided an apparatus. The apparatus comprises at least one processor and at least one memory including computer program code. The memory and the computer program code are configured to, working with the processor, cause the apparatus to perform at least receiving a configuration message from a first BS via which the apparatus and a UE are performing ProSe communication over a first locally routed path. The memory and the computer program code are further configured to, working with the processor, cause the apparatus to perform at least establishing a connection with a second BS based on the configuration message such that the apparatus and the UE perform the ProSe communication over a second locally routed path via the second BS, wherein ciphering and deciphering of ProSe communication traffic at a specific protocol layer is performed by the apparatus and the UE rather than the first and second BSs.

According to an aspect of the present invention, there is provided an apparatus. The apparatus comprises means for sending, from the apparatus, a first configuration message to at least one of two UEs which are performing ProSe communication over a first locally routed path via the apparatus such that the two UEs perform the ProSe communication over a second locally routed path via a second BS. The apparatus also comprises means for sending, from the apparatus, a second configuration message to the second BS such that the second BS is configured to support the two UEs to perform the ProSe communication over the second locally routed path via the second BS, wherein ciphering and deciphering of ProSe communication traffic at a specific protocol layer by the apparatus is skipped such that the ciphering and deciphering are performed by the two UEs or by the second BS and the two UEs.

According to another aspect of the present invention, there is provided an apparatus. The apparatus comprises means for receiving, at the apparatus, a configuration message from a first BS via which two UEs are performing ProSe communication over a first locally routed path. The apparatus also comprises means for establishing a connection with at least one of the two UEs based on the configuration message such that the two UEs perform the ProSe communication over a second locally routed path via the apparatus, wherein ciphering and deciphering of ProSe communication traffic at a specific protocol layer is performed by the apparatus rather than the first BS.

According to a further aspect of the present invention, there is provided an apparatus. The apparatus comprises means for receiving a configuration message from a first base station via which the apparatus and a UE are performing ProSe communication over a first locally routed path. The apparatus also comprises means for establishing a connection with a second BS based on the configuration message such that the apparatus and the UE perform the ProSe communication over a second locally routed path via the second BS, wherein ciphering and deciphering of ProSe communication traffic at a specific protocol layer is performed by the apparatus and the UE rather than the first and second BSs.

According to an aspect of the present invention, there is provided a computer program product comprising a non-transitory computer readable medium having code portions stored thereon, the program code portions being a computer readable medium and configured when said computer program product is run on a computer or network device, to send, from a first BS, a first configuration message to at least one of two UEs which are performing ProSe communication over a first locally routed path via the first BS such that the two UEs perform the ProSe communication over a second locally routed path via a second BS. The program code portions are also configured to send, from the first BS, a second configuration message to the second BS such that the second BS is configured to support the two UEs to perform the ProSe communication over the second locally routed path via the second BS, wherein ciphering and deciphering of ProSe communication traffic at a specific protocol layer by the first BS is skipped such that the ciphering and deciphering are performed by two UEs or by the second BS and the two UEs.

According to another aspect of the present invention, there is provided a computer program product comprising a non-transitory computer readable medium having code portions stored thereon, the program code portions being a computer readable medium and configured when said computer program product is run on a computer or network device, to receive, at a second BS, a configuration message from a first BS via which two UEs are performing ProSe communication over a first locally routed path. The program code portions are also configured to establish a connection with at least one of the two UEs based on the configuration message such that the two UEs perform the ProSe communication over a second locally routed path via the second BS, wherein ciphering and deciphering of ProSe communication traffic at a specific protocol layer is performed by the second BS rather than the first BS.

According to a further aspect of the present invention, there is provided a computer program product comprising a non-transitory computer readable medium having code portions stored thereon, the program code portions being a computer readable medium and configured when said computer program product is run on a computer or network device, to receive, by one of two UEs, a configuration message from a first BS via which two UEs are performing ProSe communication over a first locally routed path. The program code portions are also configured to establish a connection with a second BS based on the configuration message such that the two UEs perform the ProSe communication over a second locally routed path via the second BS, wherein ciphering and deciphering of ProSe communication traffic at a specific protocol layer is performed by the two UEs rather than the first and second BSs.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION OF EMBODIMENTS

Figure 1:
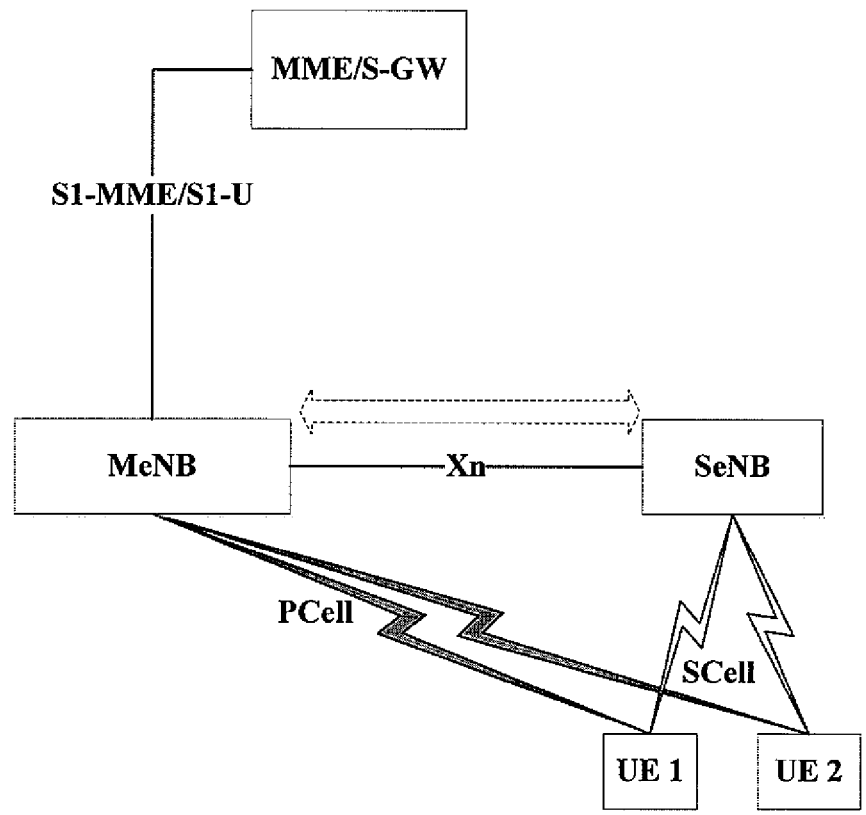
FIG. 1 illustrates an exemplary dual connectivity architecture for a small cell with inter-site CA in which embodiments of the present invention can be practiced.

In the current 3GPP Rel-12, a number of studies on LTE Device-to-Device ProSe in RAN aspects have been published, in which the exemplary dual connectivity architecture for a small cell with inter-site CA is mentioned and shown in FIG. 1 for easy discussion.

As illustrated in FIG. 1, a UE 1 and a UE 2 communicate with a MeNB in a PCell and communicate with a SeNB in a SCell. The MeNB and SeNB can communicate user plane/control plane data or signaling with each other via an Xn interface. The communication link established between the MeNB and SeNB is generally referred to as a backhaul link, which is used to offload the communication traffic to the SeNB so as to alleviate the transmission pressure upon the MeNB.

In the communication architecture in FIG. 1, since the UE 1 and UE 2 are depicted as having the same SCell served by the SeNB, it is desirable to have the ProSe traffic over the smell cell. However, in the inter-site CA, the assumed user plane protocol is master-slave or independent RLC, which assumes PDCP ciphering/deciphering in the MeNB instead of SeNB. For ProSe communication traffic, this means that there will be back-and-forth routing over the Xn interface, which is over a non-ideal backhaul link, as indicated by dotted arrows in FIG. 1. This is undesired because there would be heavy traffic load in the non-ideal backhaul link and the latency of the non-ideal backhaul link will be increased further, which in turn may cause performance degradation of inter-site CA over the non-ideal backhaul link.

In order to address and alleviate at least some of the problems as discussed above, the embodiments of the present invention propose an efficient manner of configuring the SCell such that the ProSe communication and traffic offloading via the SCell can be well supported in the inter-site CA. In particular, the embodiments of the present invention propose methods, apparatuses and computer program products for ProSe communication by configuring the SCell under consideration of different user plane options with different security assumptions such that the heavy load of the non-ideal backhaul link between Macro eNB and SCeNB can be alleviated or even eliminated.

Figure 2:
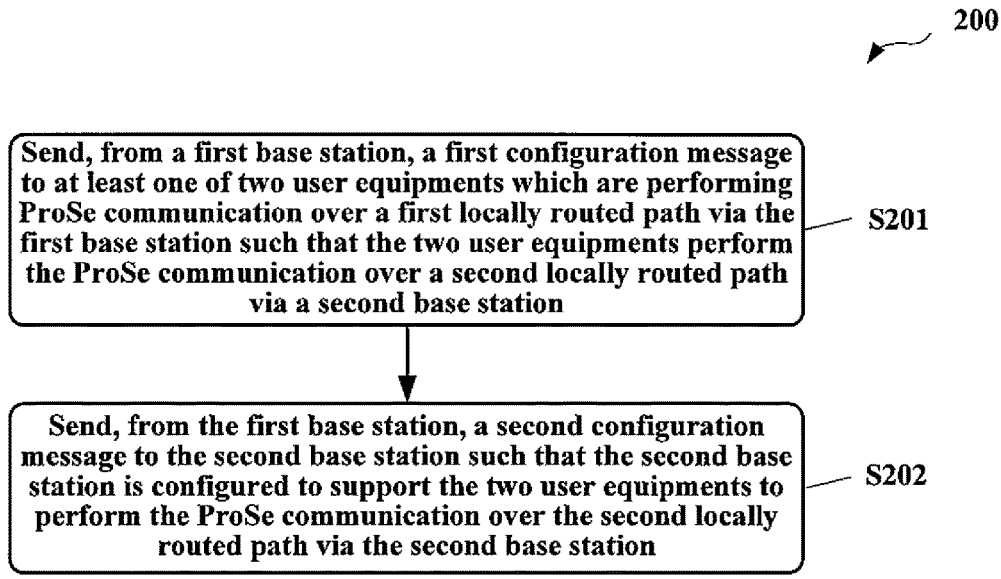
FIG. 2 is a flow chart schematically illustrating a method for ProSe communication according to an embodiment of the present invention.

FIG. 2 is a flow chart schematically illustrating a method 200 for ProSe communication according to an embodiment of the present invention. As illustrated in FIG. 2, at step S201, the method 200 sends from a first BS (e.g., MeNB), a first configuration message to at least one of two UEs (e.g., UE 1 and UE 2) which are performing ProSe communication over a first locally routed path via the first BS such that the two UEs perform the ProSe communication over a second locally routed path via a second BS (e.g., SeNB). According to an embodiment, the first locally routed path is a communication path that goes through UE 1, MeNB, and UE 2 in sequence or in reverse. In other words, the UE 1 and UE 2 communicate with one another via the MeNB. The second locally routed path may be the path that the UE 1 and UE 2 can communicate with one another via the SeNB and the MeNB for the ProSe communication, supposing that the UE 1 is served by the SeNB and the UE 2 is served by the MeNB, as the scenario shown in FIG. 5.

At step S202, the method 200 sends, from the first BS, a second configuration message to the second BS such that the second BS is configured to support the two UEs to perform the ProSe communication over the second locally routed path via the second BS. In the meantime, two UEs are still controlled by the first BS and cellular traffic can still be maintained.

During the ProSe communication, the method 200 enables the first BS to bypass ciphering and deciphering of ProSe communication traffic at a specific protocol layer, e.g., a PDCP layer which may be responsible for security handling, i.e., integrity protection/check and ciphering/de-ciphering, and also header compression for RBs. Consequently, the ciphering and deciphering of the ProSe communication traffic at the specific protocol layer would be performed by the two UEs or by the second BS and the two UEs. In other words, according to the method 200, the ciphering and deciphering of the ProSe communication traffic at the specific protocol layer is skipped or skipped at the first BS and will be carried out at the second BS and the UEs participating in the ProSe communication or be carried out at the UE without ciphering and deciphering involvement of the second BS, depending on different implementations.

In an embodiment, it is incumbent upon the second BS to perform the ciphering and deciphering of the ProSe communication traffic between the two UEs. To this end, the second configuration message is set to include configuration parameters regarding user plane paths to be established between the two UEs and the second BS. These configuration parameters include but are not limited to parameters in association with UE context, e.g., security keys for the ProSe communication traffic. By means of these configuration parameters, a third locally routed path may be established that the UE 1 and UE 2 can communicate with one another merely via the SeNB for the ProSe communication, as the scenario shown in FIG. 6.

In another embodiment, the two UEs are responsible for ciphering and deciphering of the ProSe communication traffic without ciphering and deciphering involvement of the second BS. To this end, the first and third configuration messages include configuration parameters regarding locally routed path security keys. To allow RLC layer bridging or forwarding in the second BS, the first BS also configure the related context information like RB identifies or logical channel IDs in the second BS. By these configurations, the UEs and the second BS should be able to distinguish the EPS user data and the ProSe user data.

With the method 200 and its variants as discussed above in the various embodiments, which might be implemented at the first BS, the load of the non-ideal backhaul link between the first BS and the second BS can be significantly reduced since the ciphering and deciphering of the ProSe communication traffic is skipped at the first BS. Further, the latency attributable to the back-and-forth routing over the non-ideal backhaul link would be observably shortened, thereby giving the data rate and the user experience for the ProSe communication a big boost.

Figure 3:
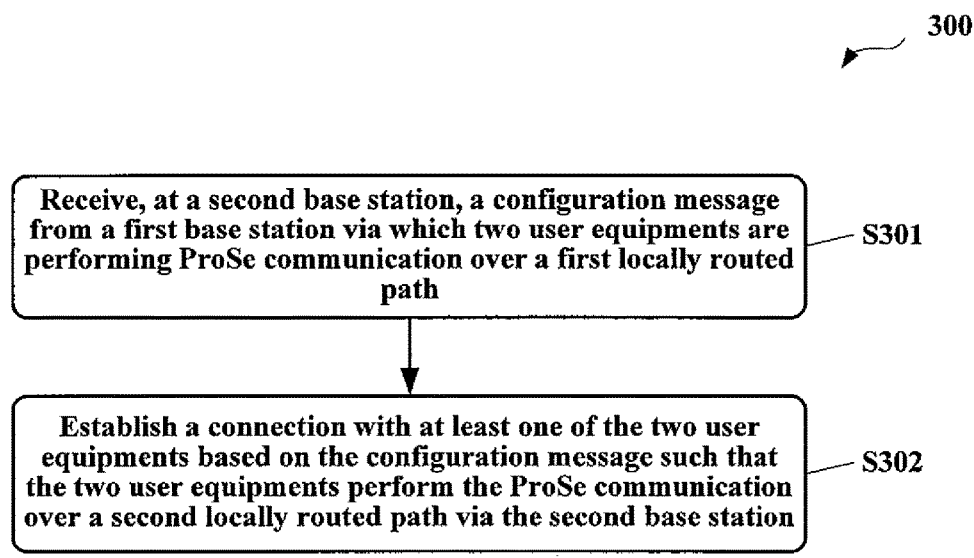
FIG. 3 is a flow chart schematically illustrating a method for ProSe communication according to another embodiment of the present invention.

FIG. 3 is a flow chart schematically illustrating a method 300 for ProSe communication according to another embodiment of the present invention. As illustrated in FIG. 3, at step S301, the method 300 receives, at a second BS, a configuration message from a first BS via which two UEs are performing ProSe communication over a first locally routed path. Similar to the discussion with respect to the method 200, the first BS could be the MeNB and the second BS could be SeNB as illustrated in FIG. 1 and the first locally routed path could be the path established between the two UEs via the MeNB.

At step S302, the method 300 establishes a connection with at least one of the two UEs based on the configuration message such that the two UEs perform the ProSe communication over a second locally routed path via the second BS. Establishing a connection with one of the two UEs occurs when the one UE (e.g., UE 1) enters into the service coverage of the second BS while another UE (e.g., UE 2) is still outside of the service coverage of the second BS. In this case, the second locally routed path would be established passing the UE 1, the SeNB, the MeNB, and the UE 2 and vice versa, as the scenario shown in FIG. 5. Establishing connections with the two UEs takes place when both UEs are within the service coverage of the same SeNB. In this case, a third locally routed path would the path established between the UE 1 and UE 2 merely via the SeNB, as the scenario shown in FIG. 6. It should be noted that the two UEs are still connected with the first BS for possible cellular traffic, e.g., EPS traffic.

As noted before, in the method 300, the ciphering and deciphering of ProSe communication traffic at a specific protocol layer is performed by the second BS rather than the first BS. In this manner, the ciphering and deciphering of the ProSe communication traffic at the first BS (e.g., the MeNB) can be removed and therefore the occurrence of possible overload over the non-ideal backhaul link can be decreased and further the latency of the non-ideal backhaul link will be accordingly reduced.

Figure 5:
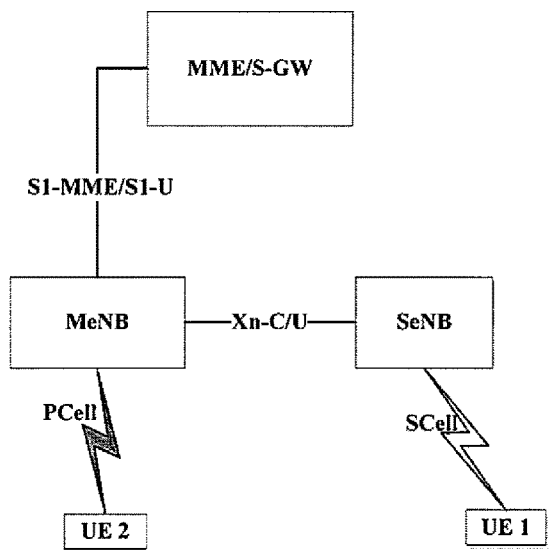
FIG. 5 illustrates a simplified example network architecture for ProSe communication according to an embodiment of the present invention.
Figure 6:
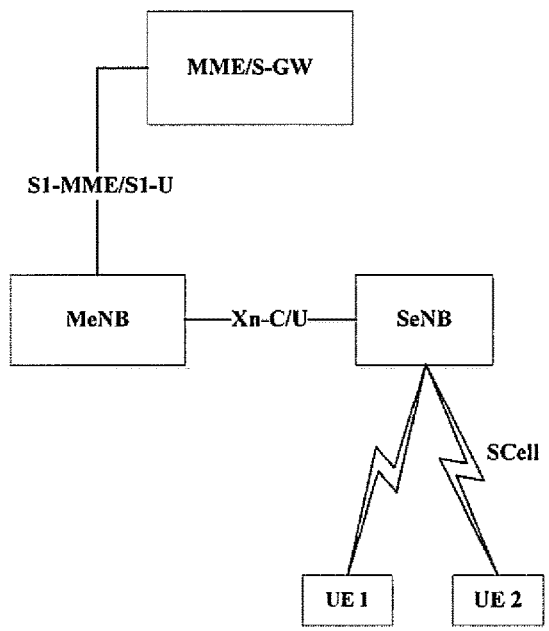
FIG. 6 illustrates a simplified example network architecture for ProSe communication according to another embodiment of the present invention.

For example, in a situation in which the second locally routed path has been established as shown in FIG. 5, the ProSe communication traffic which is assumed to be originated from the UE 1 may be ciphered at a specific protocol layer by the UE 1 and transmitted to the SeNB, at which the traffic would be deciphered and further ciphered at the specific protocol layer and then transmitted to the MeNB. As mentioned before, according to the embodiments of the present invention, the MeNB would not conduct ciphering and deciphering operations on the traffic at the specific protocol layer and forward it to the UE 2. Upon receipt of the traffic from the MeNB, the UE 2 would decipher it at the specific protocol layer using the security keys already known to the UE 1 and the SeNB. In a situation in which the third locally routed path has been established as shown in FIG. 6, the ProSe communication traffic which is assumed to be originated from the UE 1 may be ciphered at the specific protocol layer and then transmitted to the SeNB. Upon receipt of the traffic from the UE 1, the SeNB would decipher it and then cipher the traffic again. After that, the ciphered traffic would be transmitted from the SeNB directly to the UE 2. Upon receiving the ciphered traffic, the UE 2 would decipher it at the specific protocol layer.

In an embodiment, the configuration message may include context information of the two UEs in the ProSe communication such that the second BS is enabled to cipher and decipher the ProSe user traffic. In another embodiment, the specific protocol layer is a PDCP layer.

Figure 4:
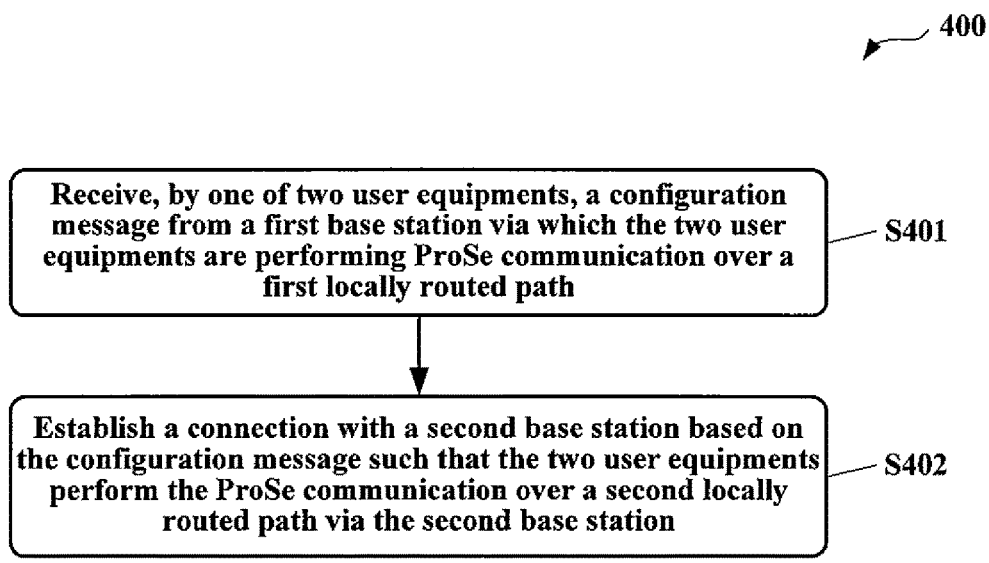
FIG. 4 is a flow chart schematically illustrating a method for ProSe communication according to another embodiment of the present invention.

FIG. 4 is a flow chart schematically illustrating a method 400 for ProSe communication according to another embodiment of the present invention. As illustrated in FIG. 4, at step S401, the method 400 receives, by one of two UEs, a configuration message from a first BS via which the two UEs are performing ProSe communication over a first locally routed path. Similar to the methods 200 and 300, the first locally routed path in the method 400 may refer to the path established between the UE 1 and UE 2 via the MeNB without CN involvement. Again, the first BS may be the MeNB.

At step S402, the method 400 establishes a connection with a second BS based on the configuration message such that the two UEs perform the ProSe communication over a second locally routed path via the second BS. Further, ciphering and deciphering of ProSe communication traffic at a specific protocol layer is performed by the two UEs rather than the first and second BSs.

Similar to the discussions made with reference to FIG. 3 regarding the method 300, the first locally routed path may be established between the UE 1 and UE 2 via the MeNB and the second locally routed path may be established between the UE 1 residing in the coverage of the SeNB and UE 2 via the MeNB and SeNB both. Once the UE 1 and UE 2 are both attached to the same SeNB, the third locally routed path could be established between the UE 1 and UE 2 merely via the SeNB.

Unlike the methods 200 and 300, in the method 400, the ciphering and deciphering of ProSe communication traffic at a specific protocol layer is performed by the two UEs rather than the first and second BSs. In other words, the ciphering and deciphering operations on the ProSe traffic are skipped at the MeNB and SeNB, which may only play a role of storing and forwarding the ProSe traffic between the UE 1 and UE 2. To this end, the configuration message as received from the first BS may include configuration parameters regarding locally routed path security keys for the two UEs. Further, the first BS may configure the related context information like RB identifies or logical channel IDs in the second BS in advance such that the second BS is able to implement the RLC layer bridging or forwarding to the UE 1 or UE 2. The specific protocol layer discussed herein may be a PDCP layer.

FIG. 5 illustrates a simplified example network architecture for ProSe communication according to an embodiment of the present invention. As illustrated in FIG. 5, the MeNB connects with the SeNB via an Xn user/control plane interface while connects with the MME/S-GW entity via an S1-MME/S1-U interface. As discussed previously, the communication path starting from the UE 1, passing the SeNB and MeNB and terminating at the UE 2 or in reverse forms the second locally routed path. According to the embodiments of the present invention, the ciphering and deciphering of the ProSe communication traffic at a specific protocol layer (e.g., a PDCP layer) can be implemented at the UE 1 and UE 2 without involvement of the SeNB and the MeNB. In other words, the legacy ciphering and deciphering of the ProSe communication traffic at the PDCP layer would be skipped at the SeNB and the MeNB.

FIG. 6 illustrates a simplified example network architecture for ProSe communication according to another embodiment of the present invention. The overall architecture shown in FIG. 6 is similar to that shown in FIG. 5 except that the UE 1 is connecting with the UE 2 merely via the SeNB for the ProSe communication, which has been referred to as the third locally routed path before. In such a connection approach, the ciphering and deciphering of the ProSe communication traffic at a specific protocol layer (e.g., a PDCP layer) can be carried out by all three, UE 1, UE 2 and the SeNB, based on the configuration of the MeNB. Therefore, the back-and-forth routing over the Xn interface which may result in heavy traffic load can be alleviated and improved and the performance of inter-site CA over the non-ideal backhaul cannot be adversely affected. Alternatively or additionally, the ciphering and deciphering of the ProSe communication traffic at the PDCP layer can be conducted by both UE 1 and UE 2 except for the SeNB. In this case, as noted before, the SeNB only takes the responsibility of bridging or forwarding the ProSe communication traffic between the UE 1 and UE 2.

It should be understood that the architecture and communication connections are depicted in FIGS. 5 and 6 as illustrative and those skilled in the art can understand that the practical connections may be more complex than those illustrated. For example, for an illustrative and simplified purpose, the wireless communication connections for the legacy services, such as EPS services are not shown. In particular, the wireless connection between the MeNB and the UE 1 for EPS services is omitted in FIG. 5 and likewise the wireless connections between the MeNB and the UEs 1 and 2 for EPS services are also omitted in FIG. 6. It can be understood that once the EPS service is ongoing, the ciphering and deciphering of the EPS traffic at the PDCP layer is still implemented by the MeNB. That is, the legacy ciphering and deciphering mechanism is not affected by the embodiments of the present invention.

Figure 7:
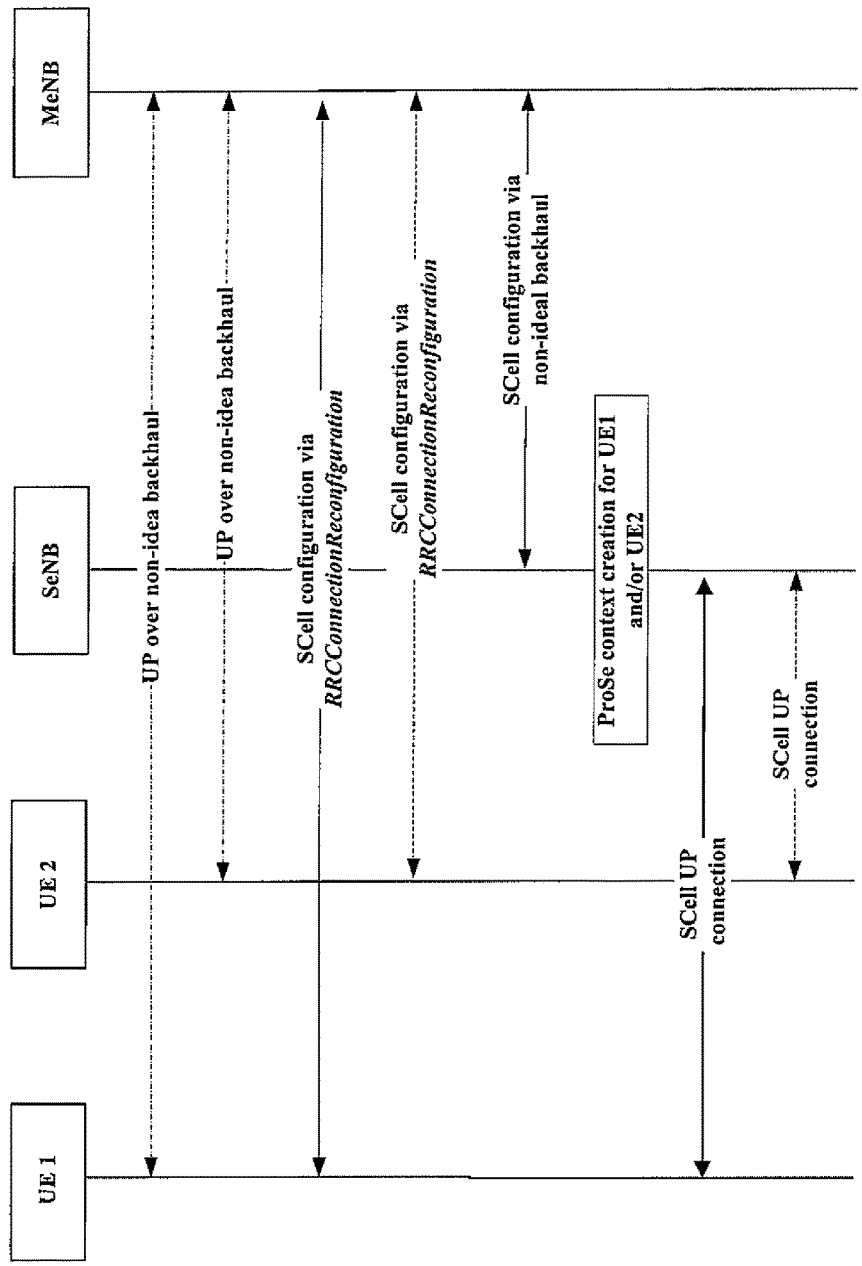
FIG. 7 shows a messaging diagram illustrating exemplary signalling according to an embodiment of the present invention.

FIG. 7 shows a messaging diagram illustrating exemplary signaling according to an embodiment of the present invention. It is assumed that at the outset, the UE 1 and UE 2 are in the ProSe communication via the non-idea backhaul link. That is, the UE 1 and UE 2 are connected with each other through the MeNB and SeNB and performing user plane communication over the non-ideal backhaul link. With the movement of the UE 1 and UE 2, they may come into the coverage area of the same SeNB. Upon detection of this situation, the MeNB sends the Scell configuration information via the RRCConnectionReconfiguration message to the UE 1 and UE 2, respectively. The Scell configuration information herein may include UE configuration parameters for the new user plane path including security flags and associated parameters. In particular, the MeNB may configure ProSe pair keys for two UEs to cipher and decipher the user traffic. By this way, the UE may employ different security handling for both EPS and ProSe traffic. Meanwhile, the MeNB may configure the SeNB via the non-ideal backhaul link. The configuration regarding the SeNB may include UE context parameters in the SeNB.

Upon the Scell configuration via the non-ideal backhaul link, the SeNB may create the ProSe communication context for the UE 1 and/or UE 2. After that, the UE 1 or UE 2 may establish the Scell user plane connection with the SeNB and the ciphering and deciphering of the ProSe communication traffic at the PDCP layer can be implemented at the UE 1, UE 2 and SeNB. Therefore, in the ProSe communication, the ciphering and deciphering of the Prose communication traffic at the MeNB is skipped.

In an alternative embodiment, the Scell configuration via the non-ideal backhaul link may include the related context information like RB identifies or logical channel IDs in the SeNB. Based on such Scell configuration, the SeNB may not cipher or decipher the ProSe traffic but only bridge or forward the ProSe traffic between the UE 1 and UE 2.

Figure 8:
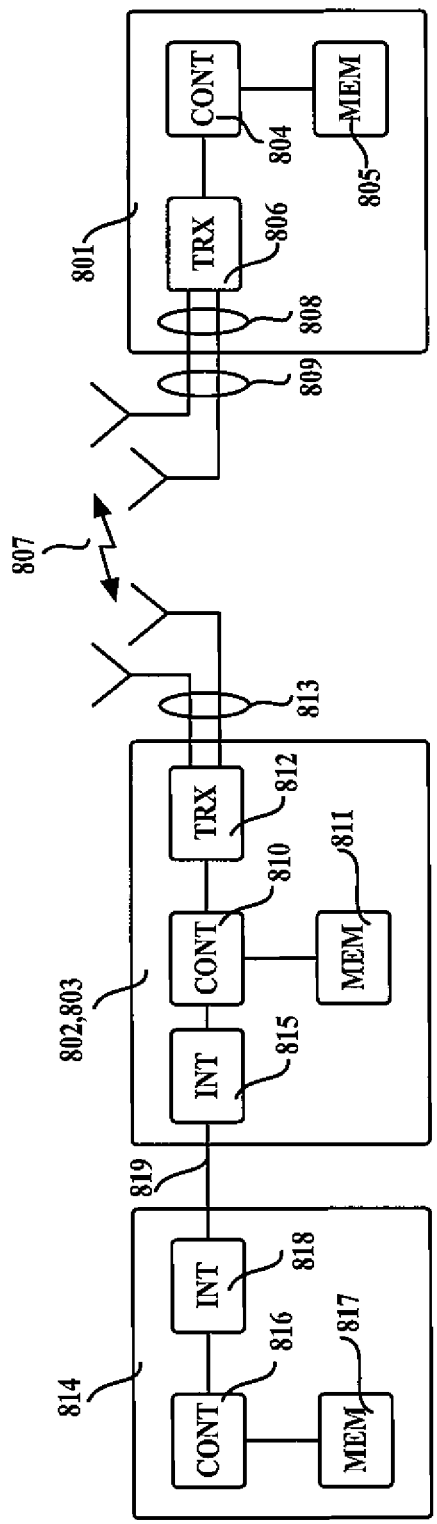
FIG. 8 is a simplified schematic block diagram illustrating apparatuses according to an embodiment of the present invention.

FIG. 8 is a simplified schematic block diagram illustrating apparatuses according to an embodiment of the present invention. As illustrated in FIG. 8, a UE 801 is located in the area of a radio network node 802 or 803 and is configured to be in connection with the radio network node 802 or 803. The UE 801 comprises a controller 804 operationally connected to a memory 805 and a transceiver 806. The controller 804 controls the operation of the UE 801. The memory 805 is configured to store software and data. The transceiver 806 is configured to set up and maintain a wireless connection 807 to the radio network node 802 or 803. The transceiver 806 is operationally connected to a set of antenna ports 808 connected to an antenna arrangement 809. The antenna arrangement 809 may comprise a set of antennas. The number of antennas may be one to four, for example. The number of antennas is not limited to any particular number. The UE 801 may also comprise various other components, such as a user interface, camera, and media player. They are not displayed in the figure due to simplicity.

The radio network node 802 or 803, such as an LTE macro BS (or MeNB) or LTE small BS (e.g., SeNB) comprises a controller 810 operationally connected to a memory 811, and a transceiver 812. The controller 810 controls the operation of the radio network node 802 or 803. The memory 811 is configured to store software and data. The transceiver 812 is configured to set up and maintain a wireless connection to the UE 801 within the service area of the radio network node 802 or 803. The transceiver 812 is operationally connected to an antenna arrangement 813. The antenna arrangement 813 may comprise a set of antennas. The number of antennas may be two to four, for example. The number of antennas is not limited to any particular number. The radio network node 802 or 803 may be operationally connected (directly or indirectly) to another CN or LAN network element 814 of the communication system, such as a radio network controller (RNC), an MME, an MSC server (MSS), an MSC, an RRM node, a gateway GPRS support node, an OAM node, an HLR, a VLR, a serving GPRS support node, a GW, and/or a server, via an interface 815. The network element 814 comprises a controller 816 operationally connected to a memory 817, and an interface 818. The controller 816 controls the operation of the network element 814. The memory 817 is configured to store software and data. The interface 818 is configured to connect to the radio network node 802 or 803 via a connection 819. The embodiments are not, however, restricted to the network given above as an example, but a person skilled in the art may apply the solution to other communication networks provided with the necessary properties. For example, the connections between different network elements may be realized with IP connections.

Although the apparatus 801, 802, 803, or 814 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communication system. The user terminal presents information to the user and allows the user to input information. In other words, the user terminal may be any terminal capable of receiving information from and/or transmitting information to the network, connectable to the network wirelessly or via a fixed connection. Examples of the user terminals include a game console, a laptop (a notebook), a personal digital assistant, a mobile station (mobile phone), and a smart phone.

The apparatus 801, 802, 803, or 814 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 805, 811, or 817 may include volatile and/or non-volatile memory and typically stores content, data, or the like. For example, the memory 805, 811, or 817 may store computer program code such as software applications (for example for sending or receiving the configuration and establishing the communication connection) or operating systems, information, data, content, or the like for a processor to perform steps associated with operation of the apparatus 801, 802, 803 or 814 in accordance with the embodiments of the present invention. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus, comprising:
   at least one processor;
   at least one memory including computer program code, the memory and the computer program code configured to, working with the processor, cause the apparatus to perform at least the following:
   send, from the apparatus, a first configuration message to at least one of two user equipments which are performing proximity service communication over a first locally routed path via the apparatus, wherein the first configuration message is for causing the two user equipments to perform the proximity service communication over a second locally routed path via the apparatus and a second base station, and wherein a locally routed path is a path established between two user equipments via at least one base station without core network involvement; and send, from the apparatus, a second configuration message to the second base station, the second configuration message for configuring the second base station to support the two user equipments to perform the proximity service communication over the second locally routed path via the apparatus and the second base station, skip, by the apparatus, ciphering and deciphering of proximity service communication traffic at a specific protocol layer to cause the ciphering and deciphering to be performed by the two user equipments or by the second base station and the two user equipments, wherein the core network is defined as not including base stations.

2. The apparatus as recited in claim 1, wherein the at least one memory and computer program code are further configured to, with the at least one processor, cause the apparatus at least to:

send, from the apparatus, a third configuration message to another one of the two user equipments, the third configuration message for causing the two user equipments to perform the proximity service communication over a third locally routed path communication.

3. The apparatus as recited in claim 2, wherein the second locally routed path from one user equipment to another one of the two user equipments passes both the apparatus and the second base station and the third locally routed path is established between the two user equipments merely via the second base station.

4. The apparatus as recited in claim 2, wherein the first and third configuration messages include configuration parameters regarding locally routed path security keys for the two user equipments to cipher and decipher proximity service user traffic at the specific protocol layer.

5. The apparatus as recited in claim 1, wherein the second configuration message includes configuration parameters regarding user plane paths to be established between the two user equipments and the second base station such that the second base station performs the ciphering and deciphering at the specific protocol layer.

6. The apparatus as recited in claim 1, wherein the configuration message includes context information of the two user equipments in the proximity service communication via the second or a third locally routed path through the second base station.

7. The apparatus as recited in claims 1, wherein the specific protocol layer is a packet data convergence protocol layer.

8. An apparatus, comprising:
at least one processor;
at least one memory including computer program code, the memory and the computer program code configured to, working with the processor, cause the apparatus to perform at least the following:
receive, at the apparatus, a configuration message from a first base station via which two user equipments are performing proximity service communication over a first locally routed path via the first base station, wherein a locally routed path is a path established between two user equipments via at least one base station without core network involvement; and establish a connection with at least one of the two user equipments based on the configuration message which causes the two user equipments to perform the proximity service communication over a second locally routed path via the apparatus;

perform, by the apparatus, ciphering and deciphering of proximity service communication traffic at a specific protocol layer rather than by the first base station, wherein the core network is defined as not including base stations.

9. The apparatus as recited in claim 8, wherein the at least one memory and computer program code are further configured to, with the at least one processor, cause the apparatus at least to:

establish a connection with another one of the two user equipments based on the configuration message which causes the two user equipments to perform the proximity service communication over a third locally routed path.

10. The apparatus as recited in claim 9, wherein the second locally routed path from one user equipment to another one of the two user equipments passes both the first base station and the apparatus and the third locally routed path is established between the two user equipments merely via the apparatus.

11. The apparatus as recited in claim 8, wherein the received configuration message includes configuration parameters regarding user plane paths to be established between the two user equipments and the apparatus for causing the apparatus to perform the ciphering and deciphering at the specific protocol layer.

12. The apparatus as recited in claim 8, wherein the configuration message includes context information of the two user equipments in the proximity service communication via the second locally routed path through the apparatus.

13. The apparatus as recited in claim 8, wherein the configuration message includes context information of the two user equipments in the proximity service communication via a third locally routed path merely through the apparatus.

14. The apparatus as recited in claim 8, wherein the specific protocol layer is a packet data convergence protocol layer.

15. An apparatus, comprising:
at least one processor;
at least one memory including computer program code, the memory and the computer program code configured to, working with the processor, cause the apparatus to perform at least the following:
receive a configuration message from a first base station via which the apparatus and a user equipment are performing proximity service communication over a first locally routed path via the first base station, wherein a locally routed path is a path established between two user equipments via at least one base station without core network involvement;

establish a connection with a second base station based on the configuration message for causing the apparatus and the user equipment to perform the proximity service communication over a second locally routed path via the second base station, wherein the core network is defined as not including the first and second base stations; and perform ciphering and deciphering of proximity service communication traffic at a specific protocol layer.

16. The apparatus as recited in claim 15, wherein the ciphering and deciphering of proximity service communication traffic at a specific protocol layer by the first base station is skipped and the ciphering and deciphering are performed by the apparatus and the user equipment or by the apparatus, the second base station and the user equipment.

17. The apparatus as recited in claim 15, wherein the configuration message includes configuration parameters regarding locally routed path security keys for the apparatus and the user equipment to cipher and decipher proximity service user traffic at the specific protocol layer.

18. The apparatus as recited in claim 15, wherein the at least one memory and computer program code are further configured to, with the at least one processor, cause the apparatus at least to:

perform the proximity service communication with the user equipment Over a third locally routed path.

19. The apparatus as recited in claim 18, wherein the second locally routed path from the apparatus to the user equipment passes both the first base station and second base station and the third locally routed path is established between the apparatus and the user equipment merely via the second base station.

20. The apparatus as recited in claim 15, wherein the specific protocol layer is a packet data convergence protocol layer.

* * * * *